May 31, 1966    J. L. WEBSTER    3,253,847
FRAME CONSTRUCTIONS AND PARTS AND METHODS
FOR MAKING THE SAME OR THE LIKE
Filed Dec. 12, 1961

INVENTOR
JOHN L. WEBSTER

BY Glenn, Palmer &
Matthews

HIS ATTORNEYS

United States Patent Office 3,253,847
Patented May 31, 1966

3,253,847
FRAME CONSTRUCTIONS AND PARTS AND METHODS FOR MAKING THE SAME OR THE LIKE
John L. Webster, Henrico County, Va., assignor to Reynolds Metal Company, Richmond, Va., a corporation of Delaware
Filed Dec. 12, 1961, Ser. No. 158,843
2 Claims. (Cl. 287—189.36)

This invention relates to frame constructions, such as picture frames and the like, and to various parts and methods for making such frame constructions or the like. It is well known that substantially rectangular picture frames or the like are generally formed by mitering the ends of four like frame members and, thereafter, assembling and securing together the mitered ends in abutting relation.

However, it has been found that the prior known means for securing together such frame members are not only complicated and expensive, but also are time-consuming and require relatively skilled labor.

According to the teachings of this invention, however, improved means and methods are provided whereby the frame members can be assembled and secured together in any desired configuration thereof by utilizing a simple wedging action that does not require expensive or time-consuming securing procedures and can be accomplished by relatively unskilled labor.

Therefore, it is an object of this invention to provide an improved frame construction having one or more of the novel features of this invention.

Another object of this invention is to provide improved parts for such a frame construction or the like.

A further object of this invention is to provide improved methods for making such a frame construction or the like.

Other objects, uses and advantages of this invention are apparent from a reading of this description which proceeds with reference to the accompanying drawings forming a part thereof and wherein.

Figure 1:
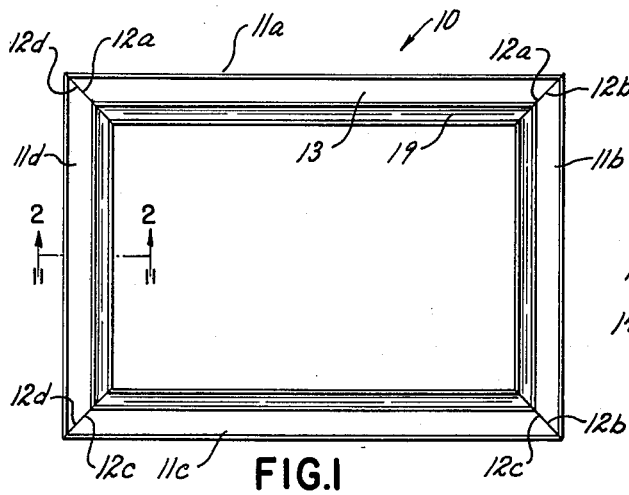
FIGURE 1 is a front view of an improved frame construction of this invention.

While the various features of this invention are hereinafter described and illustrated as forming a substantially rectangular frame construction, it is to be understood that the various features of this invention can be modified to form frame constructions of any desired configurations.

Therefore, this invention is not to be limited to only the embodiment thereof illustrated in the drawings, because the drawings are merely utilized to illustrate one of the wide variety of uses of this invention.

Referring now to FIGURE 1, an improved frame construction of this invention is generally indicated by the reference numeral 10 and comprises four hollow frame members 11a, 11b, 11c, and 11d respectively, having mitered ends 12a, 12b, 12c, and 12d secured in abutting relation in a manner hereinafter described to form the completed frame construction 10.

Figure 2:
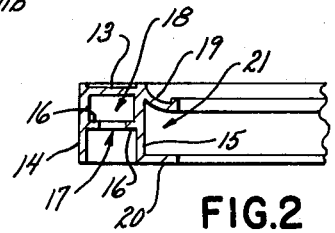
FIGURE 2 is an enlarged, fragmentary, cross-sectional view taken on line 2—2 of FIGURE 1 and illustrating the cross-sectional configuration of the frame members of the frame construction of FIGURE 1.

Each frame member 11a, 11b, 11c and 11d has the same cross-sectional configuration as illustrated in FIGURE 2 and comprises a front wall 13 having a pair of opposed spaced side walls 14 and 15 interconnected to the ends thereof and extending rearwardly therefrom. Each side wall 14 and 15 has an inwardly directed flange 16 disposed spaced from the front wall 13 and from the other flange 16 to define a slot 17 interconnecting the rear of the respective frame member 11 to a channel portion defined between the front wall 13 and flanges 16 thereof.

The side wall 15 of each frame member 11 has a pair of flanges 19 and 20 extending outwardly therefrom to define a channel 21 therebetween which is adapted to receive the desired article or articles framed by the frame construction 10 in a manner well known in the art.

While the frame members 11 can be formed in any suitable manner and of any suitable material, the embodiment of the frame members 11 of this invention as illustrated in the drawings are formed by extruding metallic material, such as aluminum-containing metallic material or the like, in a conventional extruding apparatus whereby desired lengths of extruded frame member stock can be provided and subsequently cut into the desired lengths to form the desired frame constructions 10.

Figure 3:
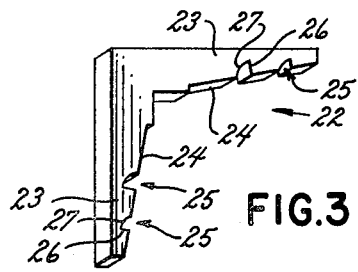
FIGURE 3 is an enlarged perspective view illustrating the improved locking member of this invention.

A locking member of this invention is provided for each corner of the desired frame construction and is generally indicated by the reference numeral 22 in FIGURE 3.

Each locking member 22 comprises a pair of legs 23 integrally connected together and disposed at any desired angle relative to each other depending upon the desired configuration of the frame construction to be formed therefrom.

For example, when forming the substantially rectangular frame construction 10, the legs 23 of each locking member 22 are disposed at substantially a right angle relative to each other.

Each leg 23 of each locking member 22 has an inner and outer side with the inner side having a beveled or tapering surface 24 provided with one or more notches 25, each notch 25 being defined by a substantially straight wall 26 and an opposed arcuate wall 27 interconnected thereto for a purpose hereinafter described.

The locking members 22 are so designed relative to the frame members 11 that the widest portion of the legs 23 of the locking members 22 are readily insertable into the channels 18 of the frame members 11 at the ends thereof in a manner hereinafter described.

Figure 4:
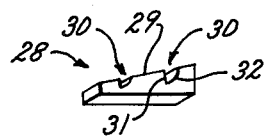
FIGURE 4 is an enlarged perspective view illustrating one of the wedging members of this invention.

Two wedging members of this invention are utilized with each locking member 22, the wedging member of this invention being generally indicated by the reference numeral 28 in FIGURE 4.

Each wedging member 28 has an inner and outer side with the inner side having a beveled or tapering surface 29 interrupted by one or more notches 30, each notch 30 being defined by a substantially straight wall 31 and an opposed arcuate wall 32 interconnected thereto in the manner similar to the notches 25 of the locking member 22.

The locking members 22 and wedging members 28 can be formed of any suitable material and in any suitable manner, and, in the embodiment illustrated in the drawings, the locking members 22 and wedging members 28 are formed from aluminum-containing metallic material or the like extruded in a conventional extruding apparatus or the like.

Figure 5:
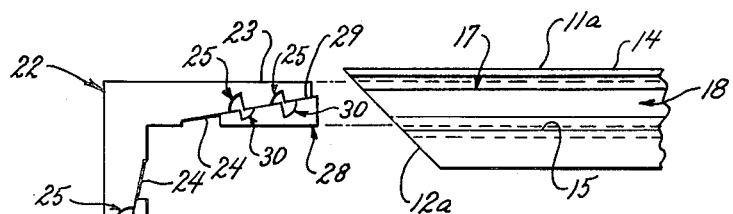
FIGURE 5 is an enlarged fragmentary view illustrating one of the steps of the method of assembling together two frame members of this invention by the parts and method of this invention.
Figure 6:
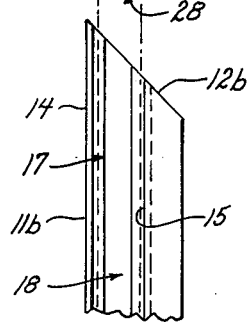
FIGURE 6 is a view similar to FIGURE 5 and illustrates the frame members fully secured together.
Figure 6:
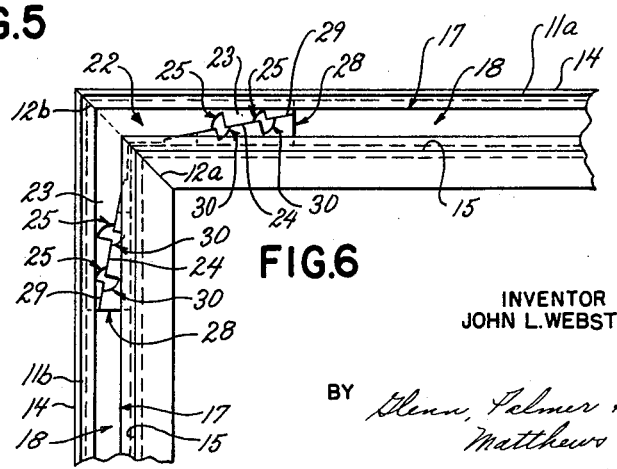

In order to assemble the frame members 11 into the frame construction 10, each locking member 22 is preferably assembled together with its associated pair of wedging members 28 in the manner illustrated in FIGURE 5 whereby the tapering surfaces 24 of the legs 23 of the locking member 22 are disposed against the tapering surfaces 29 of the wedging members 28, the wedging members 28 being temporarily secured to the legs 23 of the locking member 22 by a suitable adhesive in such a position that the interconnected wedging members 28 and locking member 22 are readily insertable into the channels 18 of the frame members 11a and 11b as illustrated in FIGURE 6.

When the wedging members 28 are temporarily secured to the locking member 22, the notches 25 and 30 of the locking member 22 and wedging members 28 are partially aligned with each other in the manner illustrated in FIGURE 5 for a purpose hereinafter described.

After the wedging members 28 have been temporarily secured to the locking members 22, the frame members 11a and 11b can be assembled together by telescoping the frame members 11a and 11b over the legs 23 and interconnected wedging members 28 in the manner illustrated in FIGURES 5 and 6 whereby the mitered ends 12a and 12b of the frame members 11a and 11b can be brought into abutting relation while the locking member 22 and interconnected wedging members 28 are fully received in the channels 18 thereof as illustrated in FIGURE 6.

Thereafter, a screwdriver or the like is readily inserted through the slot 17 of one of the frame members 11a and 11b and into a pair of aligned notches 25 and 30 of the locking member 22 and the particular wedging member 28 so that rotation of the screwdriver in the proper direction to respectively bear against the straight walls 26 and 31 of the locking member 22 and wedging member 28 will cause movement of the particular wedging member 28 relative to the respective leg 23 of the locking member 22 to force the leg 23 of the locking member 22 against the side wall 14 of the particular frame member 11a or 11b while the wedging member 28 is wedged between the tapering surface 24 of the locking member 22 and the side wall 15 of the particular frame member 11a or 11b to hold the locking member 22 fixed to the particular frame member 11a or 11b.

In this manner, each wedging member 28 locks its respective leg 23 of the locking member 22 to the respective frame member 11a or 11b, whereby the frame members 11a or 11b are held together by the locking member 22 and wedged wedging member 28.

Therefore, it can be seen that pairs of frame members 11 can be rapidly and simply secured together by the locking member 22 and the temporarily interconnected wedging members 28 to form the frame construction 10 without requiring skilled labor and expensive tools and the like.

For example, the frame construction manufacturer need only maintain a supply of extruded frame member stock which he can subsequently cut into desired lengths to form the frame members 11 which can be interconnected together by a stock of locking members 22 and wedging members 28, the wedging members 28 either being supplied individually to the frame construction manufacturer or being supplied in their interconnected relation to the locking members 22 as desired.

While it is possible to have identical spacings between the notches 25 on the locking member 22 and the notches 30 on the wedging member 28, it is preferable to have slightly unequal spacings between the notchets of these two members. Thus, when the limit of travel afforded by one pair of opposed notches is reached, the remaining pair of notches is then in such a position that the tool, such as a screw driver or the like, can be inserted in the remaining pair of notches and turned to provide additional movement for the wedging members. For example, one satisfactory spacing between the notches 25 of the locking member 22 has been found to be .320 inch with a corresponding spacing of .360 inch between the notches 30 of the wedging members 28. While only two pair of notches have been illustrated for each of the locking members 22 and wedging members 28 it will be understood that additional pairs of notches are possible.

Accordingly, it can be seen that this invention provides improved frame constructions as well as improved parts and methods for making such frame constructions or the like.

While the form of the invention now preferred has been disclosed as required by the statutes, other forms may be used, all coming within the scope of the claims which follow.

What is claimed is:

1. In combination, a pair of hollow frame members respectively having mitered ends adjacent each other, each frame member comprising a channel portion having parallel side walls, a locking member having a pair of legs respectively disposed in the channel portions of said frame members, each leg having an inner and outer side, said inner side of each leg having a tapering surface interrupted by a plurality of longitudinally spaced notches; and a pair of wedging members respectively disposed in the channel portions of said frame members, each wedging member having an inner and outer side, said inner side of each of said wedging members having a tapering surface disposed in frictional contact with the corresponding tapering surface of a respective one of said legs, said tapering surfaces of said wedging members having longitudinally spaced notches provided therein spaced from each other a distance greater than the distance between adjacent notches on the corresponding tapering surfaces of respective legs of said locking member, a succeeding notch on the tapering surface of a wedging member being out of longitudinal alignment with a succeeding longitudinally adjacent notch on the tapering surface of a respective leg when a corresponding pair of immediately preceeding notches is in longitudinal alignment, and said channel portion of said frame members opening over said notches so that succeeding longitudinally adjacent notches may be brought into longitudinal alignment and thereby force the outer sides of the respective wedging members and legs of said locking member tightly against the side walls of said channel portion of said frame members.

2. A combination as set forth in claim 1 wherein each of said frame members has a pair of inwardly directed flanges disposed over the channel portion and spaced apart a distance sufficient to permit access to said substantially aligned notches.

References Cited by the Examiner

UNITED STATES PATENTS

| 576,572 | 2/1897 | Gohlke | 20—92.7 |
|---|---|---|---|
| 743,165 | 11/1903 | Huffington | 254—42 |
| 2,188,209 | 1/1940 | Sharp | 189—36 |
| 2,192,048 | 2/1940 | Mueller | 287—127 |
| 2,451,076 | 10/1948 | Edwards | 189—36 |
| 2,464,514 | 3/1949 | Kaufmann | 29—525 |
| 2,636,254 | 4/1953 | Gunning | 29—525 |
| 2,816,632 | 12/1957 | Nardulli | 189—36 X |
| 2,965,935 | 12/1960 | Olsen | 189—36 X |

FOREIGN PATENTS

| 1,261,099 | 4/1961 | France. |
| 1,100,919 | 3/1961 | Germany. |
| 336,184 | 3/1959 | Switzerland. |

FRANK L. ABBOTT, *Primary Examiner.*

JOEL REZNEK, JACOB L. NACKENOFF, *Examiners.*

D. F. NORTON, J. D. LISTER, R. S. VERMUT,
*Assistant Examiners.*